US008097374B2

(12) United States Patent
Gottmann et al.

(10) Patent No.: US 8,097,374 B2
(45) Date of Patent: Jan. 17, 2012

(54) SYSTEM AND METHOD FOR PROVIDING REFORMED FUEL TO CASCADED FUEL CELL STACKS

(75) Inventors: Matthias Gottmann, Sunnyvale, CA (US); James McElroy, Suffield, CT (US)

(73) Assignee: Bloom Energy Corporation, Sunnyvale, CA (US)

( * ) Notice: Subject to any disclaimer, the term of this patent is extended or adjusted under 35 U.S.C. 154(b) by 1423 days.

(21) Appl. No.: 11/274,928

(22) Filed: Nov. 16, 2005

(65) Prior Publication Data

US 2007/0111054 A1 May 17, 2007

(51) Int. Cl.
*H01M 8/00* (2006.01)
*H01M 8/04* (2006.01)

(52) U.S. Cl. ......... 429/433; 429/400; 429/434; 429/436
(58) Field of Classification Search .................. None
See application file for complete search history.

(56) References Cited

U.S. PATENT DOCUMENTS

| | | | |
|---|---|---|---|
| 3,935,028 A | 1/1976 | Strasser et al. | |
| 4,543,303 A | 9/1985 | Dantowitz et al. | |
| 5,601,937 A * | 2/1997 | Isenberg | 429/17 |
| 6,251,534 B1 * | 6/2001 | McElroy | 429/13 |
| 6,458,477 B1 | 10/2002 | Hsu | |
| 6,485,852 B1 * | 11/2002 | Miller et al. | 429/17 |
| 6,623,880 B1 | 9/2003 | Geisbrecht et al. | |
| 6,854,688 B2 | 2/2005 | McElroy | |
| 7,314,680 B2 | 1/2008 | Bai et al. | |
| 2002/0058175 A1 | 5/2002 | Ruhl | |
| 2003/0022052 A1 * | 1/2003 | Kearl | 429/34 |
| 2003/0054215 A1 * | 3/2003 | Doshi et al. | 429/26 |
| 2003/0134170 A1 * | 7/2003 | Sarkar et al. | 429/31 |
| 2003/0180602 A1 | 9/2003 | Finn et al. | |
| 2005/0142407 A1 * | 6/2005 | Fuller et al. | 429/23 |
| 2005/0164051 A1 | 7/2005 | Venkataraman et al. | |

OTHER PUBLICATIONS

Shaffer, Steven, "Development Update on Delphi's Solid Oxide Fuel Cell System", 2004 SECA Review Meeting, 34 pgs., http://www.netl.doe.gov/publications/proceedings/04/seca-wrkshp/Delphi%20-%20Shaffer.pdf.
Zizelman, James et al., "Solid Oxide Fuel Cell Auxiliary Power Unit—A Development Update", SAE2002, World Congress, Mar. 4-7, 2002, SAE Technical Paper Series 2002-10-0411, 10 pgs.
U.S. Appl. No. 11/276,717, Hickey et al., filed Mar. 10, 2006.
Office Action mailed Jul. 28, 2011, received in U.S. Appl. No. 12/149,984.

* cited by examiner

*Primary Examiner* — Barbara Gilliam
*Assistant Examiner* — Adam A Arciero
(74) *Attorney, Agent, or Firm* — The Marbury Law Group, PLLC

(57) ABSTRACT

A fuel cell system includes a first fuel cell stack, a second fuel cell stack arranged in a cascade configuration with the first fuel cell stack, and at least one hydrocarbon fuel reformer which is thermally integrated with at least a portion of the first stack. The system is configured such that in operation, at least partial reformation of hydrocarbon fuel occurs prior to entry into the first stack or in the first stack, and the second stack uses fuel exhaust from the first stack as fuel. A method of operating the fuel cell system includes reforming a hydrocarbon fuel to form a reformed fuel while cooling at least a portion of a first fuel cell stack, generating electricity in the first fuel cell stack using the reformed fuel, providing a fuel exhaust stream from the first fuel cell stack into a second fuel cell stack, and generating electricity in the second fuel cell stack using the fuel exhaust stream from the first fuel stack as a fuel.

6 Claims, 3 Drawing Sheets

SYSTEM AND METHOD FOR PROVIDING REFORMED FUEL TO CASCADED FUEL CELL STACKS

BACKGROUND OF THE INVENTION

The present invention is generally directed to fuel cells and more specifically to a cascaded fuel cell stack system.

Fuel cells are electrochemical devices which can convert energy stored in fuels to electrical energy with high efficiencies. High temperature fuel cells include solid oxide and molten carbonate fuel cells. There are classes of fuel cells, such as the solid oxide reversible fuel cells, that also allow reversed operation.

In a high temperature fuel cell system, such as a solid oxide fuel cell (SOFC) system, an oxidizing flow is passed through the cathode side of the fuel cell while a fuel flow is passed through the anode side of the fuel cell. The oxidizing flow is typically air, while the fuel flow is typically a hydrogen-rich gas created by reforming a hydrocarbon fuel source. The fuel cell, operating at a typical temperature between 750° C. and 950° C., enables the transport of negatively charged oxygen ions from the cathode flow stream to the anode flow stream, where the ion combines with either free hydrogen or hydrogen in a hydrocarbon molecule to form water vapor and/or with carbon monoxide to form carbon dioxide. The excess electrons from the negatively charged ion are routed back to the cathode side of the fuel cell through an electrical circuit completed between anode and cathode, resulting in an electrical current flow through the circuit.

Fuel cell stacks may be either internally or externally manifolded for fuel and air. In internally manifolded stacks, the fuel and air is distributed to each cell using risers contained within the stack. In other words, the gas flows through riser openings or holes in the supporting layer of each cell, such as the electrolyte layer, for example. In externally manifolded stacks, the stack is open on the fuel and air inlet and outlet sides, and the fuel and air are introduced and collected independently of the stack hardware. For example, the inlet and outlet fuel and air flow in separate channels between the stack and the manifold housing in which the stack is located.

Planar fuel cells are usually stacked on top of one another with the stacking direction perpendicular to the planar cell elements thereby forming an electrical series connection. Any fuel cell stack requires a supply of fuel and oxidizer as well as depleted reactant removal (which usually entails two fluid streams, but these two streams may be combined into a single stream). In a power generator containing a multitude of fuel cell stacks, the reactant fluid delivery and collection to/from these stacks can create significant complexity. Therefore it is often desirable to minimize the number of stacks which may be accomplished by stacking more cells into each stack.

However, the number of cells that can be operated in a single stack is often limited by the reactant fluid, such as fuel gas, flow to the individual cells. The fluids distribution plenum that delivers the reactant fluids to the individual cells imparts a pressure drop on the fluid flow. A taller stack implies a larger pressure drop in the distribution plenum. One consequence of increasing pressure drop is that the fluid movers in the system (pumps, blowers, or compressors) consume more energy. Another consequence of the pressure drop in the fluids distribution plenum is that cells in different regions of the stack may experience different fluid flow rates.

In a stack with identical repeating elements, the performance is limited by the weakest cell. Cells with lower reactant fluid flow rates usually perform worse than cells with higher flow rates. The fuel supply is usually kept high enough so the cell experiencing the least fuel flow can still fulfill the performance requirements of the stack.

In a stack, all cells are usually operated electrically in series. Therefore all cells operate at the same current and all cells consume the same amount of fluids. Excess fuel supplied to the cell either has to be recovered and recycled or contributes to losses in the system.

High efficiency systems strive to minimize the cell to cell flow differences and maximize the attainable fuel utilization. FIG. 1 shows a typical internally manifolded fuel cell stack 1 comprising a plurality of fuel cells 3 in which the fuel is distributed within the stack in the so called risers or riser channels, which are formed by aligned openings in all electrolytes (and/or electrodes in electrode supported cells) and interconnects. In FIG. 1, fuel is supplied upward through the fuel inlet riser 5 and depleted fuel (i.e., the fuel exhaust) is removed downward through the fuel exhaust riser 7. If this stack is built very tall, the upper cells 3 will experience less fuel flow than the lower cells 3. Therefore, the total fuel flow rate to the stack has to be increased to provide enough fuel to the cells with the lowest flow (i.e. upper cells), while cells at the bottom of the stack are supplied with excess fuel. This excess fuel contributes to a loss of efficiency, unless the unused fuel is recycled.

BRIEF SUMMARY OF THE INVENTION

One aspect of the present invention provides a fuel cell system, comprising a first fuel cell stack comprising a plurality of fuel cells of a first type, a second fuel cell stack comprising a plurality of fuel cells of the first type, and at least one hydrocarbon fuel reformer which is thermally integrated with at least a portion of the first stack. The second stack is arranged in a cascade configuration with the first fuel cell stack. The system is configured such that in operation, at least partial reformation of hydrocarbon fuel occurs prior to entry into the first stack or in the first stack, and the second stack uses fuel exhaust from the first stack as fuel.

Another aspect of the present invention provides a method of operating the fuel cell system, comprising reforming a hydrocarbon fuel to form a reformed fuel while cooling at least a portion of a first fuel cell stack, generating electricity in the first fuel cell stack using the reformed fuel, providing a fuel exhaust stream from the first fuel cell stack into a second fuel cell stack comprising the same types of fuel cells as the first stack, and generating electricity in the second fuel cell stack using the fuel exhaust stream from the first fuel stack as a fuel.

DETAILED DESCRIPTION OF THE PREFERRED EMBODIMENTS

Figure 2:
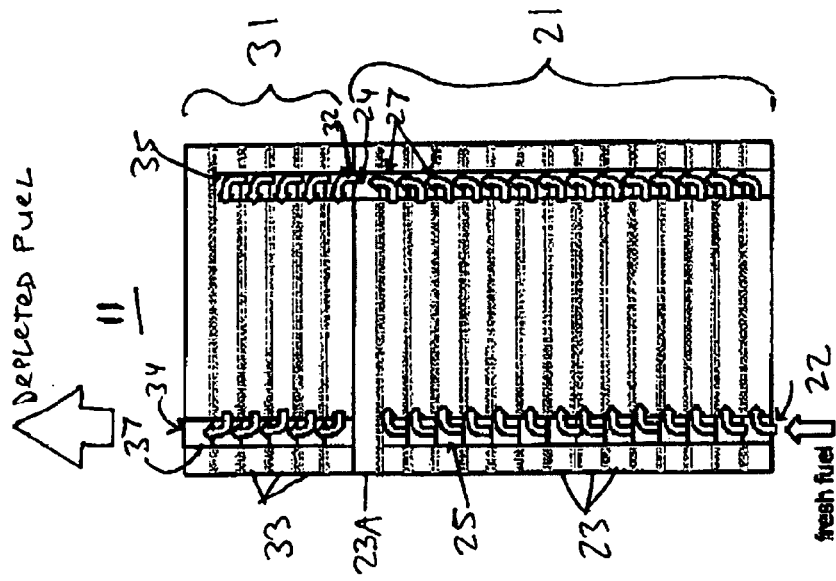
FIGS. 2 and 3 are schematic side cross sectional views fuel cell systems of alternative embodiments of the present invention.
Figure 1:
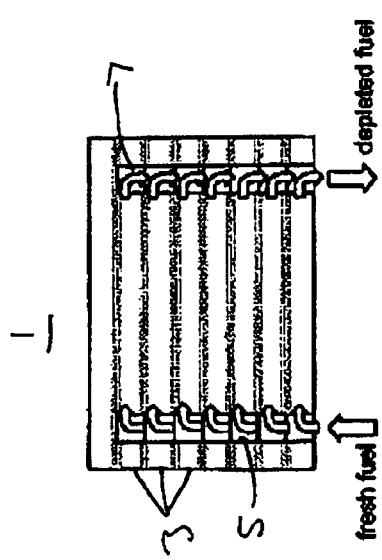
FIG. 1 is a schematic side cross sectional view of a prior art fuel cell system.

FIG. 2 illustrates a fuel cell system 11 which includes a first fuel cell stack 21, and a second fuel cell stack 31 arranged in a cascade configuration with the first fuel cell stack 21. Preferably, the incoming fuel, such as a hydrocarbon fuel, is reformed internally in the first stack (i.e., in the anode chamber or outside the anode chamber) or externally to the first stack. The internal or external reformer is preferably thermally integrated with the first stack such that the external or internal reformation cools at least a portion of the first stack. The fuel then flows upward on the left hand side of the first stack 21. For example, the reformed fuel inlet stream may flow through a fuel inlet riser 25 if the fuel cells 23 of the first stack are internally manifolded on the fuel side. The depleted fuel (i.e., the fuel exhaust) stream is removed upward through the fuel exhaust riser 27 and into the fuel inlet of the second fuel cell stack 31. The fuel inlet riser 25 is blocked off at the interface between the first stack 21 and the second stack 31. Therefore, the depleted fuel of the first stack 21 is fed from the fuel exhaust riser 27 of the first stack 21 into the fuel inlet riser 35 of the second stack containing a plurality of fuel cells 33. Thus, the second stack 31 acts as a scavenger stack, operating on fuel left behind from the first stack 21.

The fuel cells 23 of the first stack 21 are the same type of fuel cells as the fuel cells 33 of the second stack 31. For example, the fuel cells 23, 33 may both comprise coplanar solid oxide fuel cells containing a solid oxide (i.e., ceramic) electrolyte, such as YSZ, an anode electrode, such as Ni-YSZ or another electrically conductive cermet, and a cathode electrode, such as LSM or another electrically conductive ceramic. Preferably, both stacks 21, 31 are located in the same housing or enclosure. Preferably, the first stack 21 contains more fuel cells than the second stack 31.

It should be noted that the fuel cells 23, 33 do not necessarily have to be internally manifolded and may comprise externally manifolded cells. Furthermore, while FIG. 2 shows that the stacks 21, 31 comprise a plurality of planar or plate shaped fuel cells 23, 33, the fuel cells may have other configurations, such as tubular. Furthermore, while solid oxide fuel cells are preferred as the fuel cells in the stacks, other fuel cell types, such as PEM and molten carbonate fuel cells may also be used. Still further, while vertically oriented stacks are shown in FIG. 2, the fuel cells may be stacked horizontally or in any other suitable direction between vertical and horizontal.

The term "fuel cell stack", as used herein, means a plurality of stacked fuel cells which share common fuel inlet and exhaust passages or risers. The term "fuel cell stack" as used herein, includes a distinct electrical entity which contains two end plates which are connected to power conditioning equipment and the power (i.e., electricity) output of the stack. Thus, in some configurations, the electrical power output from such a distinct electrical entity may be separately controlled from other stacks.

The term "fuel cell stack" as used herein, also includes a part of the distinct electrical entity. For example, the stacks 21, 31 shown in FIG. 2 may share the same end plates, with one end plate being located below stack 21 and the second end plate being located above stack 31. In this case, the stacks 21, 31 jointly comprise a distinct electrical entity. In this case, the electrical power output from both stacks 21, 31 cannot be separately controlled.

During the operation of the system 11 to generate electricity from stacks 21 and 31, at least partial reformation of hydrocarbon fuel occurs prior to entry into the second stack 31. Preferably, but not necessarily, the second stack 31 lacks an internal hydrocarbon fuel reformer, such that no additional hydrocarbon fuel reformation occurs in the second stack during operation.

The hydrocarbon fuel may be reformed internally in the first stack 21, in which case the first stack 21 contains an internal reformer inside its housing. In other words, the reformer(s) may be located inside the stack 21 housing, outside and/or inside the anode chamber(s) of the stack. The fuel reformer may comprise a reformation catalyst coated passage located adjacent to the fuel cells.

Figure 4:
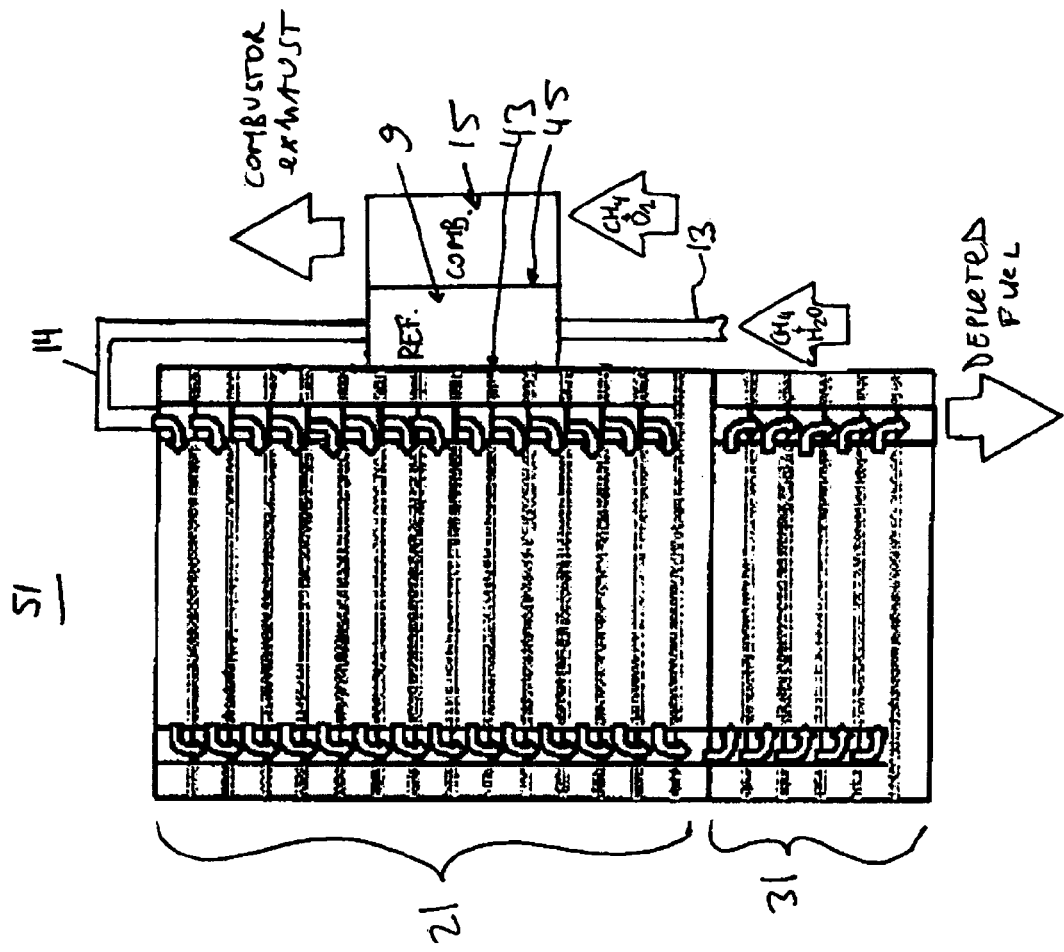
FIG. 4 is schematic, side cross sectional view of a portion of the fuel cell system with an external reformer of the embodiments of the present invention.

Alternatively, the hydrocarbon fuel may be reformed externally in an external reformer. An external reformer is located outside the housing of the first stack 21. In this case, the external reformer is preferably thermally integrated with at least a portion of the first stack 21. The term "thermally integrated" in this context means that the heat from the reaction in the fuel cell stack 21 drives the net endothermic fuel reformation reaction in the fuel reformer and the endothermic reformation reaction in the reformer thus cools the stack 21. As illustrated in FIG. 4 and as described in more detail below, the external fuel reformer may be thermally integrated with the fuel cell stack 21 by placing the reformer and stack in the same hot box and/or in thermal contact with each other, or by providing a thermal conduit or thermally conductive material which connects the stack 21 to the reformer.

Thus, the internal or the external thermally integrated reformer is used for cooling at least a portion of the first stack 21 using the endothermic hydrocarbon reformation reaction in the reformer. For example, the hydrocarbon fuel may comprise methane or natural gas (which comprises methane and other gases) and the endothermic reformation reaction may comprise the steam-methane reformation (SMR) reaction. Other hydrocarbon fuels, such as pentane, propane, etc. may also be used. The cooling of the stack allows the average temperature of the stack to be decreased. This helps to reduce high temperature oxidation of the metal interconnects/gas separator plates located between the fuel cells.

As shown in FIG. 2, the first fuel cell stack 21 includes a fuel inlet port 22 and a fuel exhaust port 24. The second fuel cell stack 31 includes a fuel exhaust port 34 and a fuel inlet port 32 which is fluidly connected to the fuel exhaust port 24 of the first stack 21. The term fluidly connected, as used herein, means that the fuel exhaust stream from the first stack can travel from the fuel exhaust port 24 into the fuel inlet port 32 either directly or indirectly through a connecting conduit.

For example, as shown in FIG. 2, the fuel exhaust riser 27 of the first stack 21 is aligned to the fuel inlet riser 35 of the second stack 31. In this case, the fuel exhaust port 24 and fuel inlet port 32 comprise adjacent contacting portions of the fuel exhaust riser 27 and the fuel inlet riser 35, respectively. In other words, the fuel cells 23, 33 are simply stacked over each other and the risers 27 and 35 constitute a single, continuous passage through the fuel cells of the stacks 21 and 31, respectively. One of the fuel cells, designated as 23A, contains a blocked fuel inlet riser channel 25 by lacking a fuel inlet riser opening in its supporting layer, such as in an electrolyte, in an electrode and/or in a gas separator plate. This fuel cell 23A acts as a partition between the first stack 21 and the second stack 31. Thus, the fuel inlet riser 25 of the first stack 21 is connected to the fuel inlet port 22 of the first stack 21. The fuel exhaust riser 27 of the first stack 21 is connected to the fuel inlet riser 35 of the second stack 31. The fuel exhaust riser 37 of the second stack 31 is connected to the fuel exhaust port 34 of the second stack 31. In the configuration of the embodiment of FIG. 2, there is only one inlet port 22 and one exhaust port 34 which are connected to outside components for both stacks 21, 31. This reduces the complexity of the system.

In configuration described above, the first stack 21 and the second stack 31 comprise a common electrical entity and share the same set of end plates. In other words, all fuel cells 23, 23A and 33 of both stacks 21, 31 are connected in series with each other, with one end plate being located in electrical contact with the bottom fuel cell of the first stack while the second end plate being located in electrical contact with the top fuel cell of the second stack, and both end plates being connected to a power conditioning system.

The first stack 21 can be built higher than commonly practiced by accepting the fuel misdistribution the first stack 21. In other words, the total fuel flow rate to the stack 21 is increased to provide enough fuel to the cells with the lowest flow (i.e. upper cells), while cells at the bottom of the stack are supplied with excess fuel. However, this excess fuel is not wasted with the fuel exhaust, because the fuel exhaust is provided as fuel to the second stack 31. The second stack 31 is preferably kept short enough to satisfy approximately equal flow through all fuel cells 23, 33, which allows maximum fuel utilization. The distribution of the cells between the stacks 21, 31 can be optimized.

While two stacks 21, 31 are illustrated in FIG. 2, three or more stacks, such as three to ten stacks may be provided in the cascade configuration. In this configuration, each subsequent stack uses the fuel exhaust stream from the previous stack as a fuel source.

Figure 3:
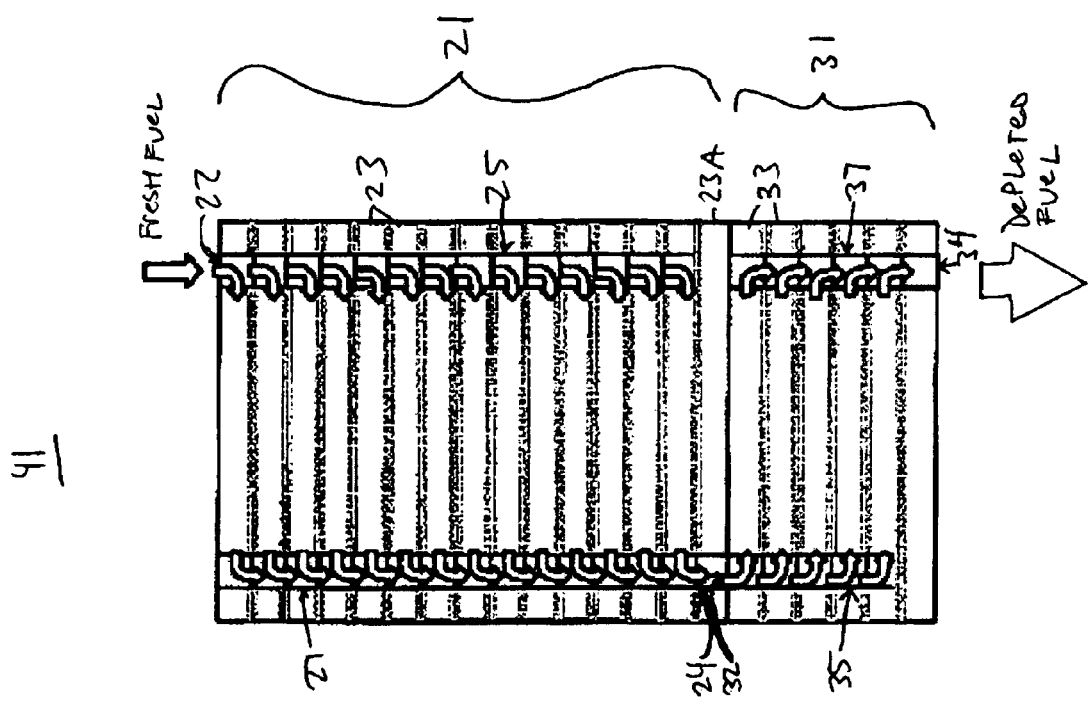

FIG. 3 illustrates a fuel cell system 41 according to a second embodiment of the invention. The system 41 is the same as the system 11 of the first embodiment, except that the first stack 21 is located above the second stack 31. In other words, the system 41 comprises a vertical system which is turned upside down compared to the system 11 of the first embodiment. Preferably, the fuel inlet port 22 of the first stack 21 of the system 41 is located in an upper portion of the first stack 21.

In the third embodiment, the reformer is selectively thermally integrated with a portion of the first stack 21 which operates at a higher temperature than one or more other portions of the first stack.

In general, the fuel cells in the middle portion of a fuel cell stack operate at a higher temperature than fuel cells in the end portions of the stack. In vertical fuel cell systems, where the fuel cells are stacked in a vertical direction, this means that the middle fuel cells generally operate at a higher temperature than the upper or lower fuel cells. However, it is possible that in some stack designs, the upper fuel cells may operate at a higher temperature than the lower fuel cells or even the middle fuel cells. Thus, the average operating temperature of the fuel cell system is often kept below a desired temperature in order to maintain the operating temperature of the middle fuel cells below a temperature at which the adjacent metal interconnects are significantly oxidized or damaged. This means that the end (i.e., upper and lower) fuel cells are operated below a desired operating temperature in order to maintain the predetermined average operating temperature of the system.

Thus, in the third embodiment of the invention, the hydrocarbon fuel reformation reaction is used to selectively cool the middle fuel cells in the system in order to provide a higher average operating temperature for the system. For example, the middle fuel cells may be cooled to a greater extent than the upper and lower fuel cells to provide a more uniform operating temperature among all fuel cells of the system and to allow the system as a whole to operate at a higher average temperature without significantly oxidizing or damaging the metal interconnects adjacent to the middle fuel cells.

In one aspect of the third embodiment, an internal reformer is provided in a middle portion of the first stack 21. The internal hydrocarbon fuel reformation reaction in the middle portion of the first stack 21 cools the fuel cells 23 in the middle portion of stack 21 more than fuel cells 23 in upper and lower portions of the first stack 21 as well as more than the fuel cells 33 in the second stack 31. An internal reformer located inside the riser channels would not selectively cool the stack in the hottest area. Thus, in the third embodiment, an internal reformer cavity may be added into the stack in which the fuel flows from a center feed outward while being reformed. At the end of the stack, the fuel flow gets turned back into the normal stack riser channel. This allows the first stack or the first and second stacks to be operated at a higher average temperature without significantly oxidizing or damaging the metal interconnects adjacent to the middle fuel cells 23. It should be noted that the internal reformer may be provided in an upper portion of the stack 21 if the stack 21 is configured such that the upper portion usually operates at a higher temperature than the middle portion of the stack 21.

In another aspect of the second embodiment, an external reformer is thermally integrated with the middle portion of the first stack 21. This thermal integration may be provided by placing the reformer in thermal contact with the middle portion of the stack 21 or by providing a thermal conduit or thermally conductive material which connects the middle portion of the stack 21 to the reformer. However, the external reformer is not intentionally thermally integrated with the end portions of the stack (i.e., the reformer is not placed in thermal contact with the end portions of the stack where the upper and lower fuel cells are located). It should be noted that the external reformer may be thermally integrated with an upper portion of the stack 21 if the stack 21 is configured such that the upper portion usually operates at a higher temperature than the middle portion of the stack 21.

FIG. 4 schematically illustrates a system 51 in which an external reformer 9 may be thermally integrated with the middle portion of the first stack 21. Examples of reformer-stack configurations are provided in US Published Application 2005/0164051 A1 filed as U.S. application Ser. No. 11/002,682 filed on Dec. 2, 2004, incorporated herein by reference in its entirety. The external hydrocarbon fuel reformer 9 is located separately from but thermally integrated with at least the first fuel cell stack 21 to support the endothermic reaction in the reformer 9 and to cool at least the middle portion of the first stack 21. The external reformer 9 may be thermally integrated only with middle but not upper or lower fuel cells of the first stack 21. For example, the reformer 9 may be located adjacent to the middle fuel cells of the first stack 21 but not adjacent to the upper or lower fuel cells of the first stack 21. Thus, the reformation reaction in the reformer 9 cools the middle cells more than the upper or lower cells of the first stack 21.

The system 11, 41, 51 of the first, second and third embodiments may also contain a burner or combustor 15, as shown in FIG. 4. Thus, the system comprises a thermally integrated reformer 9, combustor 15 and stack 21. The reformer 9 may be heated by the fuel or air exhaust from the stack, by radiative and convective heat from the stack and/or by the combustor heat during steady state operation.

Preferably, the reformer 9 is sandwiched between the combustor 15 and the stack 21 to assist heat transfer as described in more detail below. For example, the reformer 9 and the housing of the stack 21 share at least one wall. Thus, the stack 21 is located on one side and the reformer 9 is located on the other side of the wall. The wall may comprise the stack 21 housing wall.

The reformer 9 and combustor 15 may also share at least one common wall. Thus, the reformer 9 may comprise a reformation catalyst coated channel located between the stack 21 and the burner 15. For example, the reformer 9 may comprise a cylindrical reformer with the burner 15 comprising a concentric cylinder located in the core of the reformer cylinder. Alternatively, the reformer may comprise a plate shaped reformer comprising a catalyst coated passage located between the burner 15 and stack 21.

The combustor 15, when attached to the reformer 9, closes the heat balance and provides additional heat required by the reformer. When no heat is required by the reformer, the combustor unit acts as a heat exchanger. Thus, the same combustor (i.e., burner) 15 may be used in both start-up and steady-state operation of the system 1. When using combustion catalysts coated on the conduit walls, natural gas is preferably introduced at several places in the combustion zone to avoid auto ignition and local heating.

A method of operating a fuel cell systems 11, 41 of the first and the second embodiments includes reforming a hydrocarbon fuel to form a reformed fuel, generating electricity in the first fuel cell stack using the reformed fuel, providing a fuel exhaust stream from the first fuel cell stack into a second fuel cell stack, and generating electricity in the second fuel cell stack using the fuel exhaust stream from the first fuel stack as a fuel.

The step of reforming includes reforming a hydrocarbon fuel, such as methane or natural gas, in an internal reformer in the first stack 21 or in an external reformer 9 which is thermally integrated with at least a portion of the first stack 21. In operation, the hydrocarbon fuel and steam mixture is fed into the reformer 9 through a fuel inlet conduit 13. If desired, some of the fuel may be provided directly into the stack via a by-pass conduit which by-passes the reformer 9. In case of methane or natural gas fuel, the fuel and steam mixture is at least partially reformed by the SMR reaction to produce a reformed fuel stream comprising hydrogen and carbon monoxide as well as unreformed methane and carbon dioxide. The reformed fuel stream is provided from the reformer 9 into the stack fuel inlet 22 (i.e., the anode inlet in a SOFC stack) through conduit 14. Preferably, the reformed fuel stream is provided into the upper portion of the first stack 21 in the system 41 of the second embodiment. The reformation reaction, such as the partial SMR reaction in the reformer 9, cools at least a portion of the first stack 21.

The reformed fuel passes through the fuel inlet port 22 of the first stack 21 into the fuel inlet riser 25. The fuel then moves across the fuel cells 23 and out through the fuel exhaust riser 27 as a fuel exhaust stream. The fuel exhaust stream is then provided through ports 24 and 32 into the fuel inlet riser 35 of the second stack 31. This stream then moves across the fuel cells 33 and out through the fuel exhaust riser 37 and fuel exhaust port 34.

The air or another oxidizer enters the stack 21 through the air (i.e., cathode in a SOFC stack) inlet and exits through the air exhaust conduit (not shown for clarity in the figures). The system 11, 41, 51 of the first, second and third embodiments may be internally or externally manifolded on the air side. Furthermore, the air may be provided in a cascade or a non-cascade configuration through the stacks 21, 31. In a SOFC, the oxygen ions travel through the electrolyte of the fuel cells 23, 33 to combine with hydrogen in the fuel stream to form water. The oxygen ion conduction generates electricity from the fuel cells.

The foregoing description of the invention has been presented for purposes of illustration and description. It is not intended to be exhaustive or to limit the invention to the precise form disclosed, and modifications and variations are possible in light of the above teachings or may be acquired from practice of the invention. The description was chosen in order to explain the principles of the invention and its practical application. It is intended that the scope of the invention be defined by the claims appended hereto, and their equivalents.

What is claimed is:

1. A method of operating a fuel cell system, comprising:
   reforming a hydrocarbon fuel to form a reformed fuel while selectively cooling middle cells of a first fuel cell stack using a hydrocarbon reformation reaction, wherein the middle cells are cooled to a greater extent than upper and lower cells of the first fuel cell stack;
   generating electricity in the first fuel cell stack using the reformed fuel;
   providing a fuel exhaust stream from the first fuel cell stack into a second fuel cell stack comprising the same typed of fuel cells as the first stack; and
   generating electricity in the second fuel cell stack using the fuel exhaust stream from the first fuel stack as a fuel.

2. The method of claim 1, wherein:
   the first and the second stack are arranged in a cascade configuration; and
   the step of reforming occurs internally in the first fuel cell stack.

3. The method of claim 1, wherein:
   the first and the second stack are arranged in a cascade configuration; and the step of reforming occurs in an external hydrocarbon fuel reformer which is thermally integrated with the middle cells of the first fuel cell stack.

4. The method of claim 1, wherein:
   the first stack is located above the second stack.

5. The method of claim 1, wherein:
   the first and the second stacks are internally manifolded at least on a fuel side;
   the first and the second stacks comprise planar solid oxide fuel cell stacks; and
   the first stack contains more solid oxide fuel cells than the second stack.

6. The method of claim 5, wherein:
   the first stack and the second stack each comprise a fuel inlet riser and a fuel exhaust riser;
   the fuel inlet riser of the first stack is connected to a fuel inlet port of the first stack;
   the fuel exhaust riser of the first stack is aligned to the fuel inlet riser of the second stack, such that a fuel exhaust port of the first stack and a fuel inlet port of the second stack comprise adjacent contacting portions of the fuel exhaust riser of the first stack and of the fuel inlet riser of the second stack, respectively.

* * * * *